(12) United States Patent
Lewis et al.

(10) Patent No.: US 12,122,225 B2
(45) Date of Patent: Oct. 22, 2024

(54) FOLDING SLIDING VEHICLE ROOF TOP

(71) Applicant: Bestop, Inc., Louisville, CO (US)

(72) Inventors: Stephen J. Lewis, Harrison Township, MI (US); David A. Smith, Macomb Township, MI (US)

(73) Assignee: Bestop, Inc., Louisville, CO (US)

( * ) Notice: Subject to any disclaimer, the term of this patent is extended or adjusted under 35 U.S.C. 154(b) by 442 days.

(21) Appl. No.: 17/506,273

(22) Filed: Oct. 20, 2021

(65) Prior Publication Data
US 2022/0118837 A1    Apr. 21, 2022

Related U.S. Application Data (60) Provisional application No. 63/094,062, filed on Oct. 20, 2020.

(51) Int. Cl.
*B60J 7/02*     (2006.01)
*B60J 7/14*     (2006.01)

(52) U.S. Cl.
CPC ............... *B60J 7/028* (2013.01); *B60J 7/146* (2013.01)

(58) Field of Classification Search
CPC ... B60J 7/024; B60J 7/028; B60J 7/061; B60J 7/064; B60J 7/1291; B60J 7/146
USPC ............................................ 296/219, 220.01
See application file for complete search history.

(56) References Cited

U.S. PATENT DOCUMENTS

| | | | | |
|---|---|---|---|---|
| 4,066,292 A * | 1/1978 | Carli | ....................... | B60J 7/106 296/219 |
| 6,890,024 B2 * | 5/2005 | Salz | ......................... | B60J 7/047 296/220.01 |
| 6,959,961 B2 * | 11/2005 | Eiermann | ................ | B60J 7/047 296/220.01 |
| 9,216,632 B2 * | 12/2015 | Lewis | ..................... | B60J 7/061 |
| 9,828,067 B2 * | 11/2017 | Ziethe | .................... | B60J 7/0084 |
| 11,712,952 B2 * | 8/2023 | Lewis | .................... | B60J 7/1291 296/214 |
| 2008/0272627 A1 * | 11/2008 | Joab | ......................... | B60J 7/047 296/220.01 |
| 2014/0077532 A1 * | 3/2014 | Aschaber | ................. | B60J 7/047 296/219 |
| 2015/0352937 A1 * | 12/2015 | Haberkamp | ............ | B60J 10/90 296/219 |
| 2016/0263975 A1 * | 9/2016 | Bowles | ................... | B60J 7/1291 |
| 2020/0223300 A1 * | 7/2020 | Smith | .................... | B60J 7/1851 |
| 2022/0242209 A1 * | 8/2022 | Lewis | .................... | B60J 7/1291 |

* cited by examiner

*Primary Examiner* — Jason S Daniels
(74) *Attorney, Agent, or Firm* — Warn Partners, P.C.

(57) ABSTRACT

An articulating roof top cover assembly for a vehicle adapted for sealing engagement with an existing portion of a hard top roof. The articulating roof top cover assembly includes an articulating portion incorporating at least a rotatable portion and slidable portion. The articulating portion is movable between at least a closed position adapted to close off the front vehicle compartment, an open sunroof position exposing the front driver/passenger compartment for an open air feel, and a further open position exposing the rear passenger compartment for an open air feel.

17 Claims, 9 Drawing Sheets

FOLDING SLIDING VEHICLE ROOF TOP

CROSS-REFERENCE TO RELATED APPLICATIONS

This application claims the benefit of U.S. Provisional Application No. 63/094,062, filed Oct. 20, 2020. The disclosure of the above application is incorporated herein by reference.

FIELD OF THE INVENTION

The present invention relates to an openable roof top assembly adapted for a vehicle.

BACKGROUND OF THE INVENTION

Providing openable roof tops for sport utility (SUV) type vehicles is desired. In recent years, soft top technology has advanced. Foldable stowable roof soft tops are commonly used in sport-utility vehicles for recreational purposes. The foldable roof is typically moved between a stowed position, and a deployed position. When in the deployed or closed position, the foldable roof protects the occupants of the vehicle from various weather conditions. The foldable roof may also include various sections which are made of a clear material to essentially function as a window, allowing the occupant of the vehicle to see outside of the vehicle. However, there are occasions where the weather is pleasant, and it is desired by the occupants of the vehicle to move the foldable roof to a stowed or open position such that the vehicle essentially functions without part of a roof or essentially functions without a roof, and the passenger compartment of the vehicle is exposed to the atmosphere. This allows the occupants of the vehicle to enjoy more favorable weather conditions while driving.

An alternative to a convertible soft top and to a sunroof top is to use a hard top that is bulky and does not provide any open air feel without removing the entire top. If the entire hard top is removed, it then must be stored, which is often difficult because of the size of the top. Other convertible roofs use a hard top that is large and bulky and does not provide any open air feel without removing two front top panels, which is also laborious, difficult, time consuming, and ergonomically disadvantageous. If one or more of the front top panels are removed, they then must also be stored, which is often difficult because of the size weight of the panels. While this will give the occupant an open air feel, the panels are large and bulky. If the occupant wants to gain the open air feel they need to exit the vehicle and remove the panels using multiple knobs and latches and then store the panels. This makes for a time consuming operation as well as a potential storage issue due to the size of the panels. They are also hard to handle due to their size and weight and due to the fact they must be installed and removed over the operators head. In the event of inclement weather, the panels also cannot be quickly put back in place. Other conventional tops have quite large panels that are not removable from the vehicle and requires space to retract and stow, e.g., into roof structure behind the opening, when an open air feel is desired.

Accordingly, there exists a need for a more manageable and easily stowable roof top made of an articulable arrangement to provide a top that can be opened quickly to provide what is often referred to as an open air feel, where a portion of the top of the roof is moved from a closed or deployed position to an open or stowed position exposing a portion of the inside vehicle cockpit/passenger compartment to the outside without removing the top.

SUMMARY OF THE INVENTION

There is provided a rooftop assembly adapted to provide an open-air experience when desired. The rooftop assembly has at least one articulating portion with at least one articulatable panel that covers at least one roof top opening of the vehicle. Preferably, the at least one articulatable panel includes a soft top cover. Alternatively, the at least one articulatable panel includes a hard top. It is understood that a combination of hard top and soft top articulatable panel(s) are contemplated depending on the application without departure from the scope of the present invention.

Most preferably, the articulating portion includes a first articulatable panel adapted to operably open creating an open sunroof experience, and a second articulatable panel adapted to operably open the rooftop assembly further uncovering the roof top opening further (e.g., such as over the rear seating area). By way of example, a pair of linkage assemblies are rotatably coupled to the first articulatable panel to move the first panel between a closed position closing off the roof top opening and at least one open position providing a sunroof opening generally over the front cockpit, and the second articulatable panel is slidably coupled to the vehicle to open the rooftop further when desired (e.g., additionally open up a roof top opening over the rear cockpit).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

There is provided a rooftop assembly shown generally at 10 adapted to provide an open-air experience when desired. The rooftop assembly has at least one articulating portion indicated generally at 12 with at least one articulatable panel that covers at least one roof top opening of the vehicle. Preferably, the at least one articulatable panel includes a soft top cover. Alternatively, the at least one articulatable panel includes a hard top cover. Alternatively, the rooftop assembly 10 includes a combination of at least one articulatable panel including at least one hard top cover and at least one soft top cover. It is understood that a combination of hard top and soft top articulatable panel(s) are contemplated depending on the application without departure from the scope of the present invention. In the closed position, the at least one articulating portion 12 forms a cover closing off the roof top opening of the vehicle.

Figure 1:
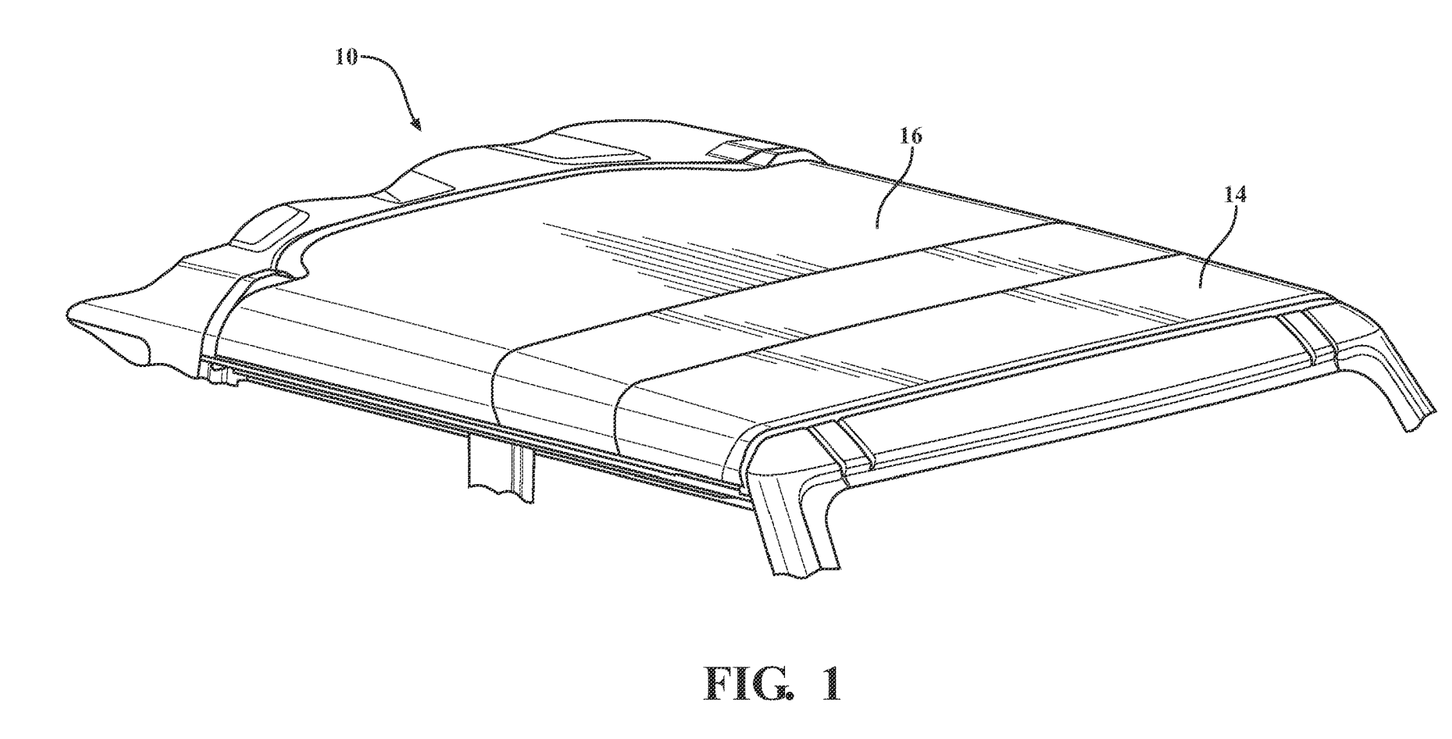
FIG. 1 is a perspective view of a rooftop assembly depicted in a closed position, in accordance with aspects of the present invention.
Figure 2:
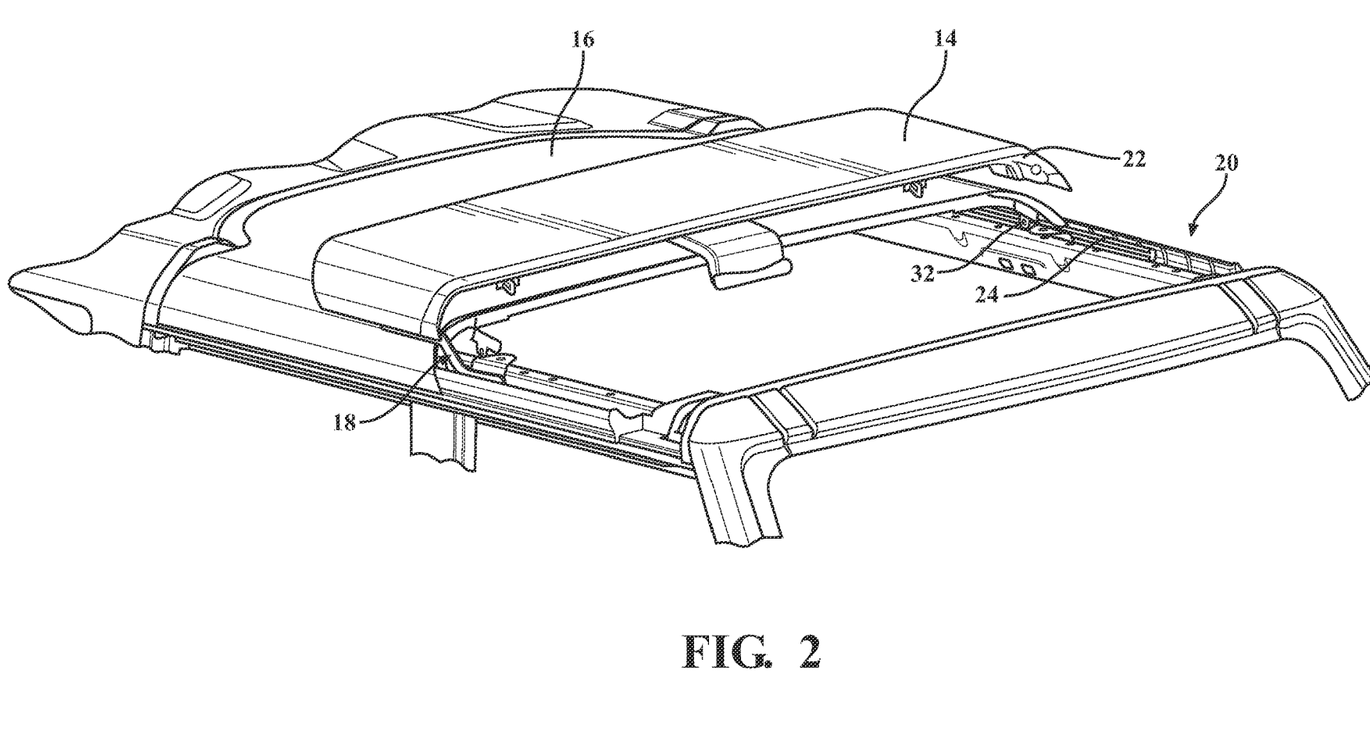
FIG. 2 is a perspective view of the rooftop assembly with a first articulatable panel depicted rotated to an exemplary open sunroof position, in accordance with aspects of the present invention.
Figure 3:
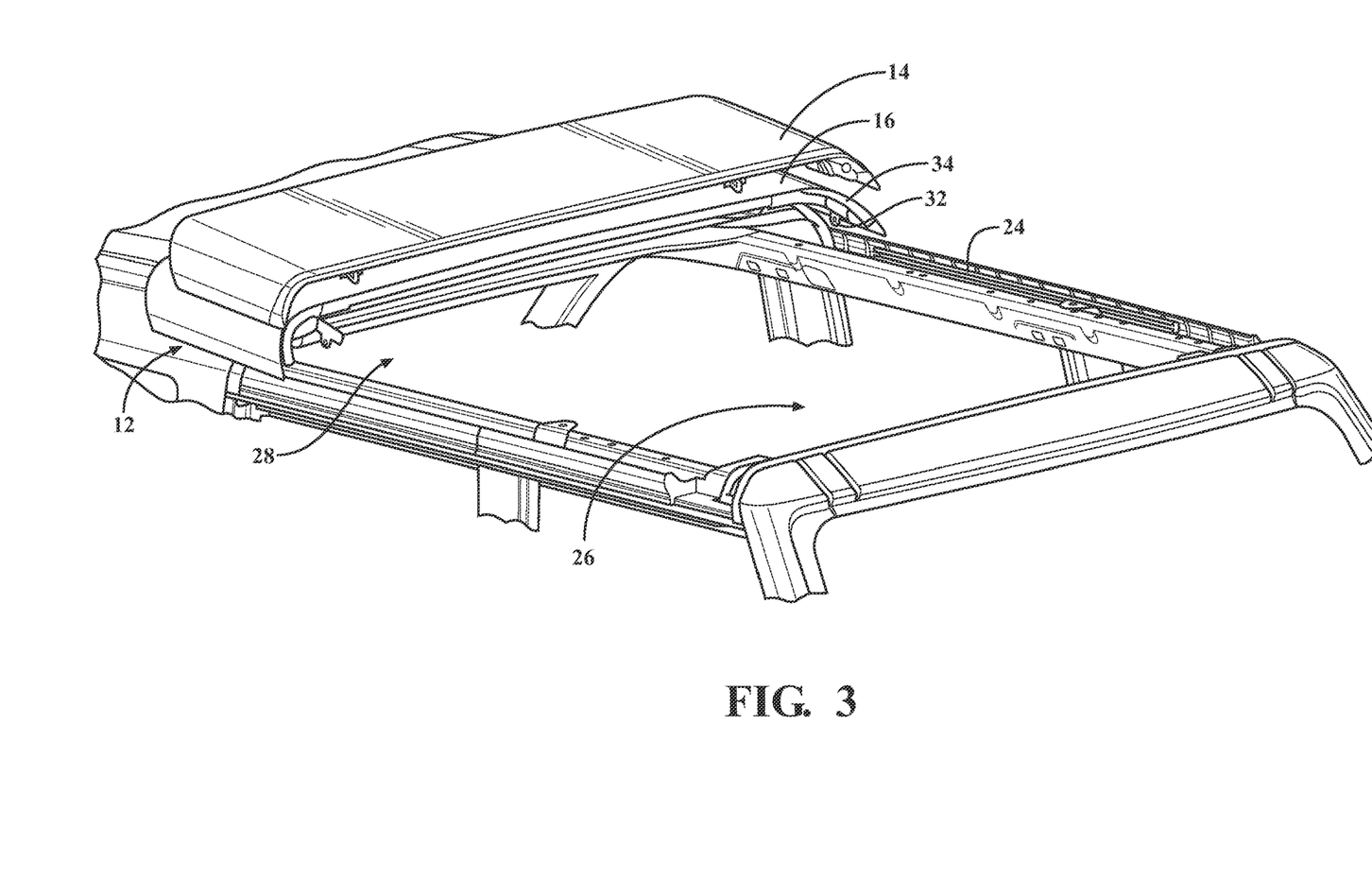
FIG. 3 is a perspective view of the rooftop assembly with a second articulatable panel depicted slid to an exemplary open roof top position, in accordance with aspects of the present invention.
Figure 4:
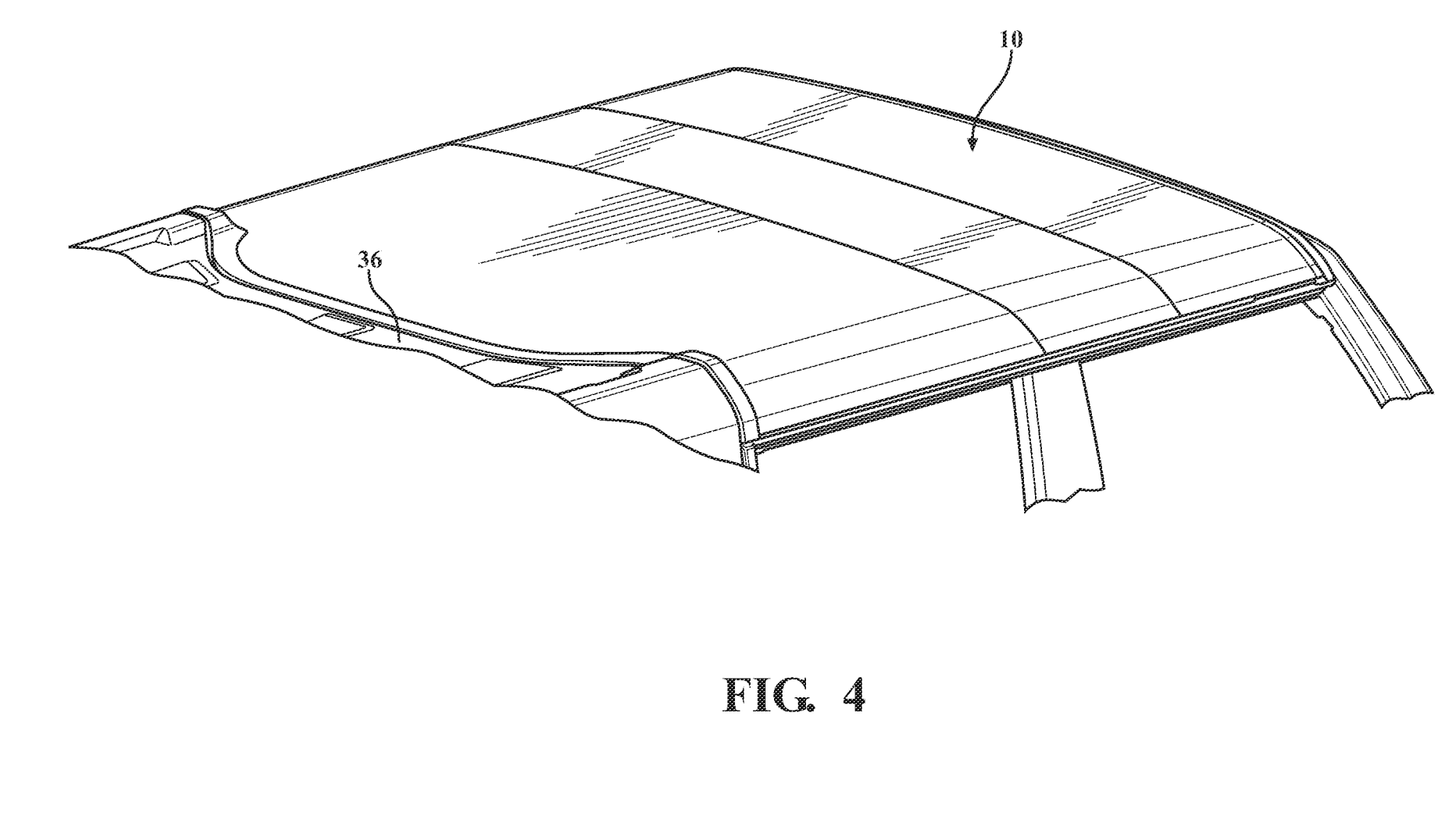
FIG. 4 is a perspective view of the rooftop assembly depicted in the closed position, in accordance with aspects of the present invention.
Figure 5:
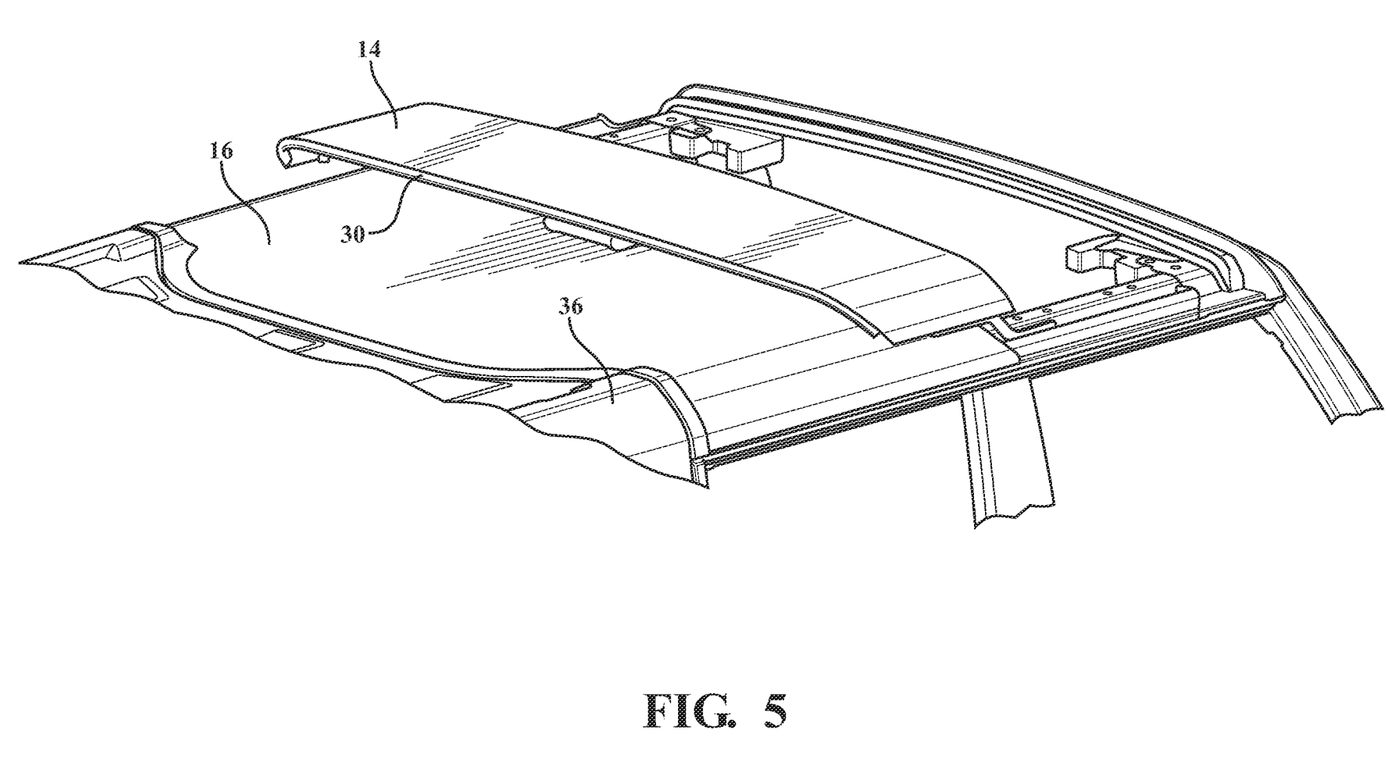
FIG. 5 is a perspective view of the rooftop assembly with the first articulatable panel depicted rotated to the exemplary open sunroof position, in accordance with aspects of the present invention.
Figure 6:
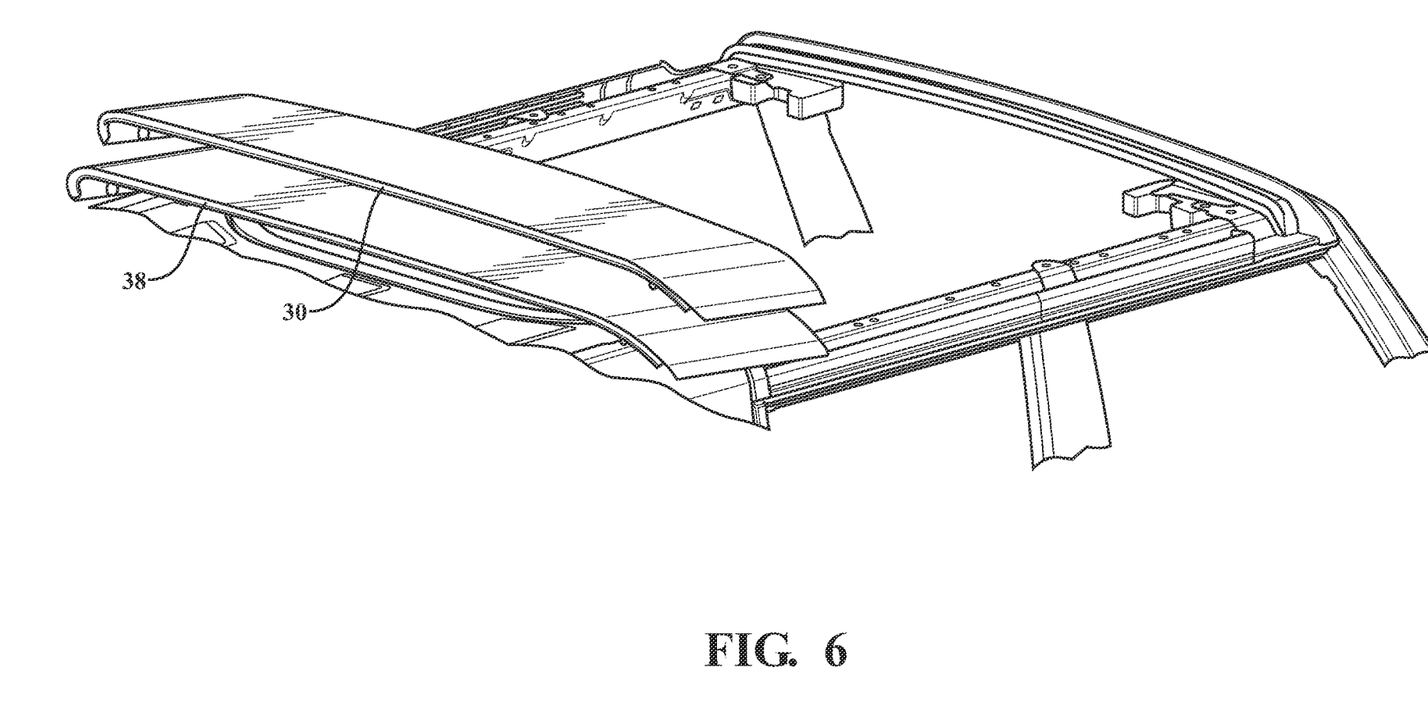
FIG. 6 is a perspective view of the rooftop assembly with the second articulatable panel depicted slid to the exemplary open roof top position, in accordance with aspects of the present invention.
Figure 7:
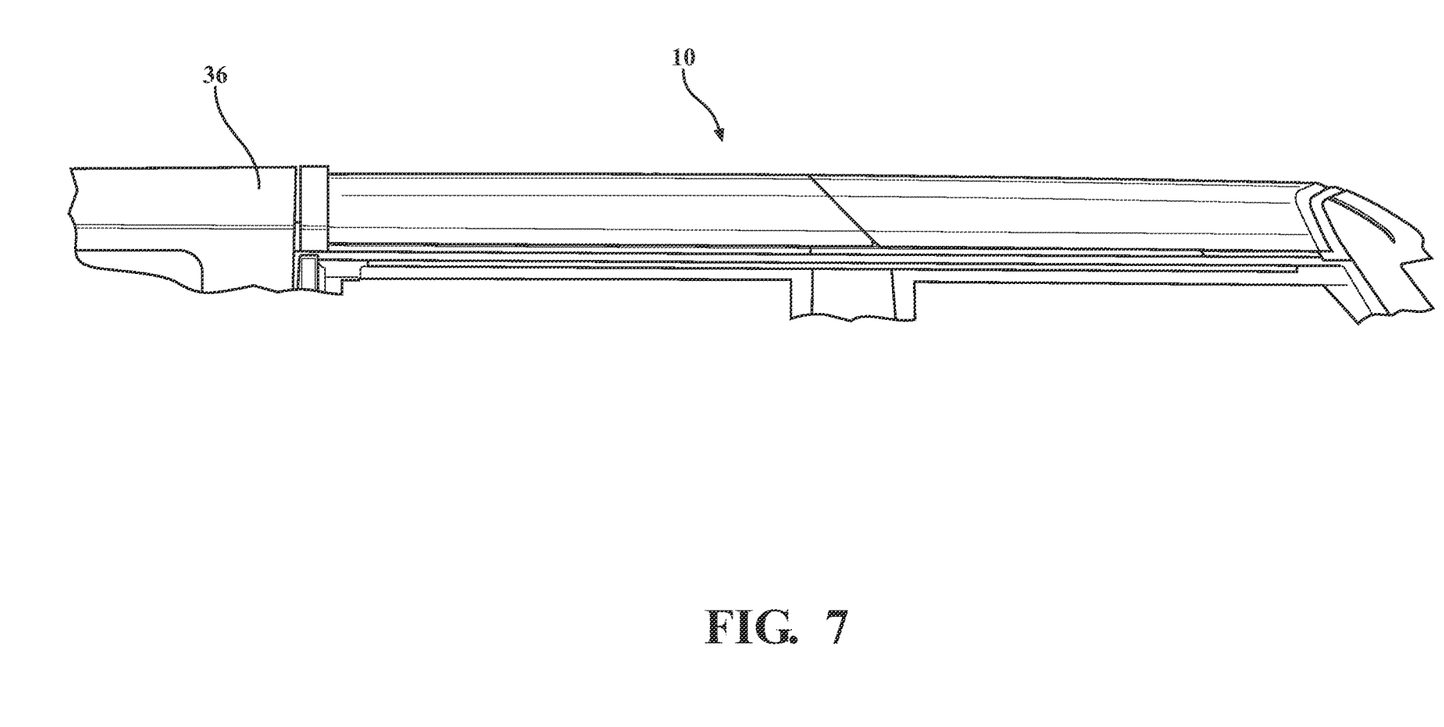
FIG. 7 is a perspective view of the rooftop assembly depicted in the closed position, in accordance with aspects of the present invention.

Most preferably, the articulating portion 12 includes at least one first articulatable panel 14 section adapted to operably open creating an open sunroof experience, and at least one second articulatable panel 16 section adapted to operably open the rooftop assembly 10 further uncovering the roof top opening further (e.g., such as over the rear seating area). By way of example, a pair of linkage assemblies indicated generally at 18 are coupled to the first articulatable panel 14 to move the first panel 14 between a closed position (FIG. 1) closing off the roof top opening 20 and at least one open position (FIG. 2) providing a sunroof opening generally over the front cockpit. Most preferably, the configuration of the linkage assemblies 18 and at least one tensioning bow 22 (e.g., a front header, etc.) maintain the front header of the first articulatable panel at substantially a horizontal position. However, any other orientation is contemplated depending on the particular application without departure from the scope of the present invention, including, but not limited to, a flip back panel, tilted panel, split panel, rollable panel, Z-top panel, X-top panel, scissor panel, etc. Each section 14 and 16 forms a part of the roof top cover adapted for operably selectively closing off/covering and opening up/uncovering the roof top opening(s) of the vehicle.

In addition, by way of example, the second articulatable panel 16 is coupled to a pair of linkage assemblies each including slidable features 32, e.g., guide rollers, slidable within at least one track 24 on each side. Alternatively, or additionally, the at least one first articulatable panel 14 is operably adapted for sliding with guides in at least one pair of opposingly disposed tracks. In a most preferred aspect of the present invention, the first articulatable panel 14 operably rotates rearward providing a sunroof opening and rotates forward to close off the rooftop opening entirely. The front header operably selectively attaches to the windshield frame of the vehicle by at least one fastener. Preferably, at least two paddle latches provided on the front header are provided that hook or otherwise selectively attach to the vehicle to secure the top in the closed position to the vehicle. In a most preferred aspect of the present invention, once the first articulatable panel is operably rotated rearward to the sunroof position, the second articulatable panel is operably slid rearward providing a more open roof top open-air experience. By way of example, when the rooftop assembly 10 is in the fully open position, both the front and rear cockpit roof top 26 and 28 openings are uncovered. It is understood that the top 10 is adaptable to slide further back to uncover the rear cargo area, and even adaptable to angle back behind the rear seating or adaptable to be dropped down into the rear cargo area tub, depending on the particular applications without departure from the scope of the present invention. It is understood that any intermediate open position is contemplated depending on the particular application without departure from the scope of the present invention.

In accordance with an aspect of the present invention, the first articulatable panel 14 is slidable between the closed position and at least one open position. By way of example, the linkages 18 are adapted to slide within guide tracks 24.

Figure 8:
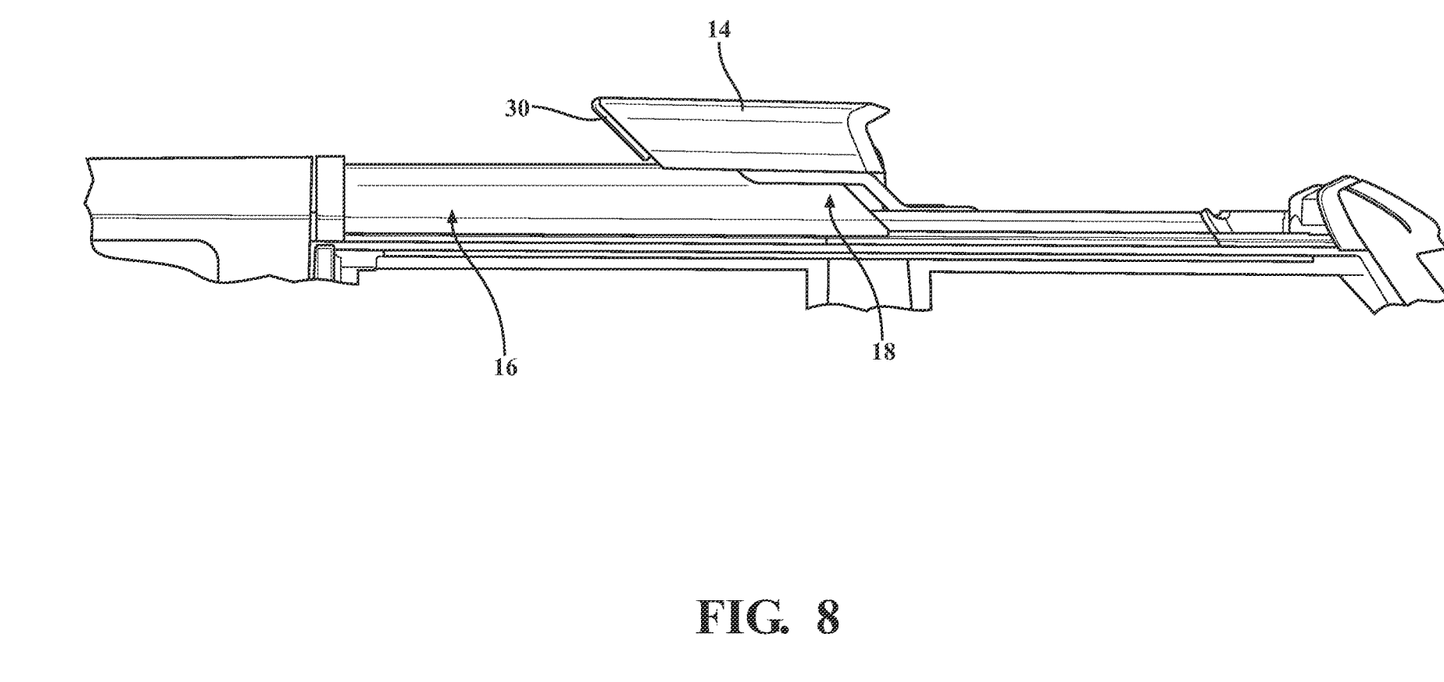
FIG. 8 is a perspective view of the rooftop assembly with the first articulatable panel depicted rotated to the exemplary open sunroof position, in accordance with aspects of the present invention.

Rotating the first articulatable panel 14 section generally rearward preferably positions the panel 14 substantially above the plane of the outer surface of the second articulatable panel 16. The panel 14 is substantially aligned horizontally relative to the second panel 16 in the first open position that partially uncovers the rooftop opening of the vehicle (e.g., FIG. 8).

Figure 9:
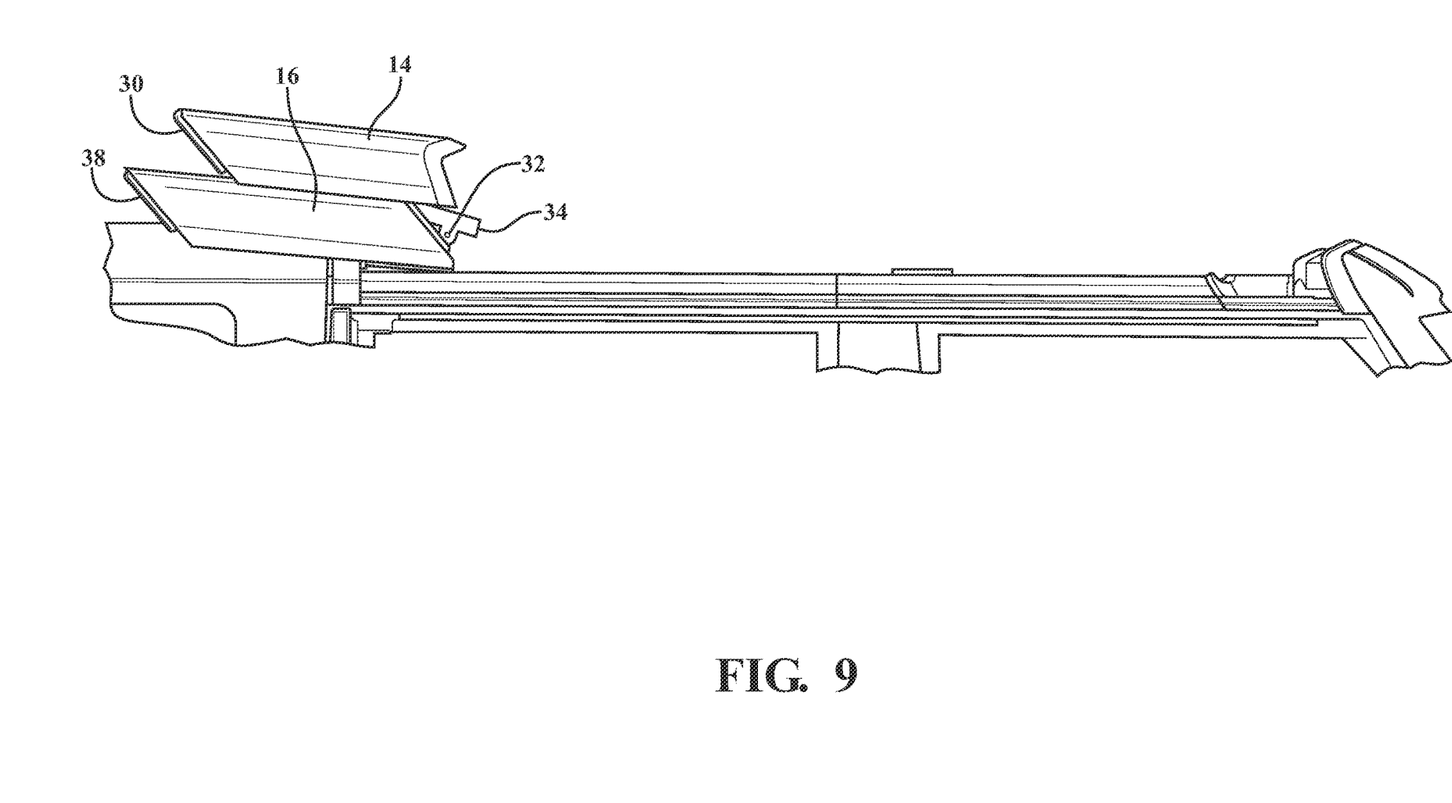
FIG. 9 is a perspective view of the rooftop assembly with the second articulatable panel depicted slid to the exemplary open roof top position, in accordance with aspects of the present invention.

The first and second articulatable panel 14, 16 section can be tilted predetermined amount to bring the panels to predetermined angles (e.g., FIG. 9). The predetermined angle of the second articulatable panel portion 16 allows the panel 16 to clear the top of the existing roof top 36 of the vehicle to prevent damage. It is contemplated that, alternatively or additionally, the panel 16 can include a linkage operably adapted to bring the panel 16 substantially horizontal relative to the existing roof top 36 positioned above the top 36 to prevent damage, without departure from the scope of the present invention. Generally, the angle is about 15 to 75 degrees. Typically, about 15 to 55 degrees. Preferably, about 20 to 55 degrees. It is understood that more or less of an angle is contemplated suitable for having the articulating portion 12 not contact the existing roof top of the vehicle, e.g., OEM hard top.

The second articulatable panel 16 can be slidable, e.g., incorporating guides adapted to slide within a track) and rotatable or otherwise capable of being positioned at an angle, (e.g., incorporating linkages, joints, hinges, or other structure adapted to angle the panel 16a predetermined amount suitable to clear the existing roof 36, incorporating a section of ramped track, incorporating a ramped stop, incorporating a guide operable to raise the rear edge to clear the existing top 36 as the panel 16 is moved generally rearward, etc.). By way of non-limiting example, the guides 32 of the second panel 16 may be selectively removed from the channel 24 (e.g., rear most end of the channel 24) and the panel raised, e.g., substantially at a predetermined angle), to clear the existing roof top of the vehicle 36 and any other predetermined structure.

The articulation of the first and/or second articulatable panels 14,16 is done manually by hand or electrically with at least one device when activated by a user, wherein the device is operable to articulate either or both panels to the sunroof open position and roof top fully open position, e.g., to rotate the first panel back/forward and/or to slide the second panel back/forward. By way of example, the top can selectively rotate back and slide with the user's flip of a switch to at least one position, or any intermediate position operably controlled by the user. By way of non-limiting example, a front cockpit control panel so that the user does not have to leave the vehicle to open the top to the desired position(s).

The articulating portion's 12 at least one first articulatable panel 14 section is a split panel or dual panel, in accordance with aspects of the present invention. A front first panel of 14 adapted to selectively be brought into sealing engagement with the vehicle windshield frame area in the closed position and adapted to rotate relative to a rear second panel of 14. By way of example, one half of the dual panel moves, e.g., rotates, over top of the second half of the dual panel, at least partially uncovering the roof top opening. The panel halves are operably stackable relative to each other and the at least one second articulatable panel 16.

At least one limiting stop is contemplated for at least the first articulatable panel to assist in setting the height of the open top. At least one stop is contemplated for at least the second articulatable panel to assist in setting the open position limits of the open top. The stop is on the links or vehicle, or an optional door rail.

By way of non-limiting example, the pair of tracks each include at least one track that is a guide track operably coupled to the vehicle adjacent to the roof top opening, preferably, attached to the roll bar of the vehicle adjacent to the top opening of the rear passenger cockpit.

The cover (e.g., soft top material outer covering) of the articulating portion 12 is one piece are a plurality of pieces integrated together or otherwise forming a unitary cover when the assembly 10 is in the closed position. The cover material is a soft material, fabric, sail cloth, etc., in accordance with aspects of the present invention. The cover material is a hard Class-A molded hard cover, in accordance with aspects of the present invention.

At least one fabric management bow is contemplated operably coupled to the first and/or second articulatable panel(s) to assist with preventing the cover from binding or being pinched, and smooth transitions from between the closed and open positions of the rooftop assembly.

It is contemplated that a plurality of attachment feature is provided to allow or selectively attaching accessories, such as at least one sun/air diffuser screen over the front cockpit and/or rear cockpit.

Optionally, the rooftop assembly has at least two first door rails connected at the roof top opening, e.g., optionally to side sport bars of the vehicle adjacent the front cockpit, providing a sealing surface for the doors of the vehicle as well as at least one pivot point at each side of the articulating portion of the rooftop assembly. Optionally, the rooftop assembly has at least two second door rails connected at the roof top opening, e.g., optionally to side sport bars or other vehicle structure adjacent the rear cockpit, optionally providing a sealing surface for the rear doors, and providing at least one sliding feature connected to or integrally formed with the at least two second door rails, e.g., at least one track sliding feature formed in the rail or connected to the rail operable to receive a corresponding glide feature of the second articulatable panel.

Optionally, the first articulatable panel is rotatably connected to the vehicle adjacent the rooftop opening of at least the front cockpit forming at least one pivot point on each side of the articulating portion, e.g., providing pivot points on sport bars or other vehicle structure adjacent the roof top opening.

Optionally, the second articulatable panel is slidably coupled to the vehicle adjacent the rooftop opening of at least the rear cockpit forming at least one glide path at least side of the second panel, e.g., via guide tracks attached to sport bars or other vehicle structure adjacent to the rear cockpit roof top opening.

Each side of the first articulatable portion has at least one first link rotatably connected to the vehicle or door rail at one end creating a pivot point, and to the front header at the other end, which front header or first bow is selectively connected to the windshield frame with quick release/secure fasteners. According to aspects of the present invention, there is at least one second link rotatably connected to the vehicle or the door rail at one end creating a pivot point. Preferably, the second end of the second link is connected to the front header, or other structure adapted to keep the front header substantially horizontal during rotation between the open and closed positions.

The link configurations are operable to move the first articulatable panel fore/aft, e.g., by rotation. Preferably, with the first bow 22 is kept substantially horizontal, but alternatively flipped back.

According to aspects of the present invention, the first articulatable panel 14 includes a rear tensioning bow 30, rear bow. Preferably, the rear tensioning bow 30 provides a closeout for sealing engagement with the second articulatable panel 16, most preferably, to a front tensioning bow 34 of the second articulatable panel 16.

According to aspects of the present invention, the second articulatable panel 16 includes a second rear tensioning bow 38, rear bow. Preferably, the rear tensioning bow 38 provides a closeout for sealing engagement with an existing seal or sealable arrangement of a hard top roof portion 36.

According to aspects of the present invention, the first articulatable panel includes a rear header, e.g., lightweight wire and/or molded halo, that is a closeout for sealing engagement with the second articulatable panel.

According to aspects of the present invention, the second articulatable panel includes a rear header, e.g., lightweight wire and/or molded halo, that is a closeout for sealing engagement with an existing seal of a hard top roof portion 36.

According to a preferred aspect of the present invention, a linkage system is provided operable to raise the second articulatable panel 16 over the leading edge of the existing hard top roof portion 36. Optionally, at least one limiting stop sets the height of the second articulatable panel over the hard top roof portion 36.

It is understood that at least one seal can be operably connected generally toward the front and/or rear of each panel 14 and 16 operably for sealing engagement to each other or adapted for sealing engagement to predetermined vehicle structure, in accordance with aspects of the present invention.

The rooftop assembly preferably uses minimal framing and mostly soft goods. This further helps with ease of installation and ease of cycle efforts of the pivotal portion. Further, the assembly is preferably mountable to the vehicle without any modification, drilling of holes, or any other change to existing hardware and structure to the vehicle other than the removal of the manufacturers existing roof cockpit panels.

It is understood that the left side of the assemblies are generally a mirror-image of the right side.

It is understood that the present invention is additionally suitable for a two door or four door vehicle. The 2-door and 4-door descriptions and drawings described herein are not limiting. It is understood that any embodiment, and combinations thereof, described herein can be modified and is/are utilizable on any convertible, 2-door or 4-door vehicle, sport utility vehicle, pickup, UTV, ATV.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rooftop assembly adapted for a vehicle, comprising:
   at least one articulating portion adapted to operably couple to the vehicle adjacent to a roof top opening of the vehicle and forming a cover adapted to selectively close off the roof top opening and uncover the roof top opening;
   at least one first articulatable panel of the at least one articulating portion selectively operably movable between a closed position and at least one open position;
   a first tensioning bow operably coupled to cover material toward the front of the at least one first articulatable panel;
   at least one second articulatable panel of the at least one articulating portion operably connected to the at least one first articulatable panel and selectively operably movable between an extended position and at least one further open position, said rooftop assembly adapted for sealing engagement with an existing roof top of the vehicle.

2. The rooftop assembly of claim 1, wherein said at least one first articulatable panel comprises at least one linkage assembly adapted to rotatably couple to the vehicle, said at least one first articulatable panel rotates in a first direction to the closed position to close off the roof top opening of the vehicle, and rotates in a second direction to at least the open position to at least partially uncover said roof top opening of said vehicle.

3. The rooftop assembly of claim 1, wherein said at least one first articulatable panel is operably coupled to said at least one second articulatable panel and sliding said at least one second articulatable panel generally rearward moves the rotating portion and slidable portion to at least one further open position uncovering the roof top opening generally over a rear passenger cockpit of the vehicle.

4. The rooftop assembly of claim 1, wherein said at least one first articulatable panel includes at least one linkage arrangement operable to set a height of the at least one first articulatable panel above the at least one second articulatable panel when said at least one first articulatable panel is in the open position.

5. The rooftop assembly of claim 1, wherein the at least one second articulatable panel is adapted for operable sealing engagement with the existing roof top of the vehicle.

6. The rooftop assembly of claim 1, further comprising at least one pair of guide tracks, said the at least one second articulatable panel slidably coupled to said at least one pair of guide tracks to move said at least one second articulatable panel from the extended position to the at least one further open position.

7. The rooftop assembly of claim 1, wherein said at least one first and second articulatable panels are adapted to be positioned at predetermined angles operable to not contact the existing roof top of the vehicle.

8. The rooftop assembly of claim 1, a wherein said first tensioning bow is adapted to operably selectively connect and disconnect to a windshield frame of the vehicle.

9. The rooftop assembly of claim 1, further comprising an outer cover operably connected to the at least one first and second articulatable panels.

10. The rooftop assembly of claim 1, further comprising a second tensioning bow operably coupled to the cover of the at least one first articulatable panel and located adjacent to the at least one second articulatable panel when the rooftop assembly is in the closed position.

11. The rooftop assembly of claim 1, further comprising a third tensioning bow operably coupled to a cover of the at least one second articulatable panel and located adjacent to the at least one first articulatable panel when the rooftop assembly is in the closed position.

12. The rooftop assembly of claim 1, further comprising a fourth tensioning bow operably coupled to a cover of the at least one second articulatable panel and adapted for operably sealing against the existing roof top of the vehicle.

13. The rooftop assembly of claim 1, wherein the at least one first articulatable panel and the at least one second articulatable panel are soft top panels.

14. The rooftop assembly of claim 1, wherein the at least one first articulatable panel is at least rotatably coupled adjacent to the roof top opening and wherein the at least one second articulatable panel is at least slidably coupled adjacent to the roof top opening.

15. The rooftop assembly of claim 14, wherein said at least one second articulatable panel is operably rotatably to a predetermined angle adapted for the at least one articulating portion to be positioned with predetermined clearances between the at least one articulating portion and the existing roof top of the vehicle.

16. A rooftop assembly adapted for a vehicle, comprising:
   at least one articulating portion adapted to operably couple to the vehicle adjacent to a roof top opening of the vehicle and forming a cover adapted to selectively close off the roof top opening and uncover the roof top opening;
   at least one first articulatable panel of the at least one articulating portion selectively operably movable between a closed position and at least one open position;
   a first tensioning bow adapted to operably selectively connect and disconnect to a windshield frame of the vehicle; and
   at least one second articulatable panel of the at least one articulating portion operably connected to the at least one first articulatable panel and selectively operably movable between an extended position and at least one further open position, said rooftop assembly adapted for sealing engagement with an existing roof top of the vehicle.

17. A rooftop assembly adapted for a vehicle, comprising:
   at least one articulating portion adapted to operably couple to the vehicle adjacent to a roof top opening of the vehicle and forming a cover adapted to selectively close off the roof top opening and uncover the roof top opening;
   at least one first articulatable panel of the at least one articulating portion selectively operably movable between a closed position and at least one open position;
   at least one second articulatable panel of the at least one articulating portion operably connected to the at least one first articulatable panel and selectively operably movable between an extended position and at least one further open position, said rooftop assembly adapted for sealing engagement with an existing roof top of the vehicle; and wherein the at least one first articulatable panel and the at least one second articulatable panel are soft top panels.

* * * * *